(12) United States Patent
Christensen

(10) Patent No.: US 8,639,195 B2
(45) Date of Patent: Jan. 28, 2014

(54) HIGH VOLTAGE SWING INPUT/OUTPUT ENABLED IN A STANDARD IC PROCESS USING PASSIVE IMPEDANCE TRANSFORMATION

(75) Inventor: Kåre Tais Christensen, Smørum (DK)

(73) Assignee: Oticon A/S, Smorum (DK)

( * ) Notice: Subject to any disclaimer, the term of this patent is extended or adjusted under 35 U.S.C. 154(b) by 172 days.

(21) Appl. No.: 13/165,476

(22) Filed: Jun. 21, 2011

(65) Prior Publication Data

US 2011/0310520 A1 Dec. 22, 2011

Related U.S. Application Data

(60) Provisional application No. 61/357,111, filed on Jun. 22, 2010.

(30) Foreign Application Priority Data

Jun. 22, 2010 (EP) ..................................... 10166743

(51) Int. Cl.
*H04B 1/44* (2006.01)

(52) U.S. Cl.
USPC ................. 455/78; 455/80; 455/88; 361/91.1

(58) Field of Classification Search
USPC ............... 455/78, 193.1–193.3, 197.2, 197.3, 455/550.1, 80, 88, 333; 361/91.1
See application file for complete search history.

(56) References Cited

U.S. PATENT DOCUMENTS

| | | | | |
|---|---|---|---|---|
| 5,526,172 A | * | 6/1996 | Kanack | 359/291 |
| 6,104,218 A | * | 8/2000 | Ueno | 327/112 |
| 8,072,722 B1 | * | 12/2011 | Hwang | 361/56 |
| 2005/0255843 A1 | | 11/2005 | Hilpisch et al. | |
| 2006/0006950 A1 | | 1/2006 | Burns et al. | |
| 2007/0024385 A1 | | 2/2007 | Greenberg | |
| 2008/0136521 A1 | | 6/2008 | Chang | |
| 2008/0186115 A1 | * | 8/2008 | Okanobu | 334/55 |
| 2008/0200134 A1 | | 8/2008 | Jongsma et al. | |
| 2008/0299913 A1 | | 12/2008 | Han et al. | |

FOREIGN PATENT DOCUMENTS

| | | |
|---|---|---|
| EP | 1460769 A1 | 9/2004 |
| EP | 1480492 A2 | 11/2004 |

* cited by examiner

*Primary Examiner* — Tuan H Nguyen
(74) *Attorney, Agent, or Firm* — Birch, Stewart, Kolasch & Birch, LLP

(57) ABSTRACT

The application relates to a method of enabling a high voltage input and/or output in a standard IC process, the high voltage being higher than specified for I/O transistors of the IC process. The application further relates to a transceiver IC and to an article of manufacture comprising a transceiver IC. The object of the present application is to provide an integrated circuit in a standard IC process that supports larger than specified input/output swings. The problem is solved in that providing that high voltage inputs or outputs of an IC implemented in said standard IC process comprise passive impedance transformation circuitry. This has the advantage of facilitating the use of a standard IC process for higher than specified voltage I/Os. The standard IC process is preferably a CMOS or BiCMOS semiconductor process. The invention may e.g. be used for low power communication devices, e.g. portable devices having a wireless interface, e.g. listening devices, e.g. hearing instruments.

20 Claims, 4 Drawing Sheets

HIGH VOLTAGE SWING INPUT/OUTPUT ENABLED IN A STANDARD IC PROCESS USING PASSIVE IMPEDANCE TRANSFORMATION

CROSS REFERENCE TO RELATED APPLICATIONS

This non-provisional application claims the benefit under 35 U.S.C. 119(e) of U.S. Provisional Application No. 61/357,111 filed on Jun. 22, 2010 and claims priority under 35 U.S.C. 119(a) to Patent Application No. 10166743.4 filed in European Patent Office, on Jun. 22, 2010. The entire contents of all of the above applications are hereby incorporated by reference.

TECHNICAL FIELD

The present application relates to integrated circuits for implementing radio transmitters and receivers, e.g. for low power, e.g. portable, electronic devices. The disclosure relates specifically to a method of enabling a high voltage input and/or output in a standard IC process, the high voltage being higher than specified for I/O transistors of the IC process.

The application furthermore relates to a transceiver IC implemented in a standard IC process, to its use and to an article of manufacture comprising a transceiver IC and an antenna.

The disclosure may e.g. be useful in applications such as low power communication devices, e.g. portable devices having a wireless interface, e.g. listening devices, e.g. hearing instruments.

BACKGROUND ART

When a high voltage swing (e.g. >3.3 $V_{pp}$) is desired on an integrated circuit (IC), a special high-voltage process is typically chosen. Such processes are, however, typically not applicable for ultra-low power applications (or expensive to use).

The thick oxide transistors (e.g. I/O-transistors) in standard CMOS integrated circuit processes can typically handle up to 5 V +/−10%, 3.3 V +/−10%, 2.5 V +/−10%, or 1.8 V +/−10%. Therefore the vast majority of all integrated circuits are designed to handle voltages lower than this. Special high voltage processes are available but they are typically not well suited for ultra low power design because the smallest, advanced, low power transistors (deep submicron) are not available.

In some cases, support of larger voltage swing gives significant benefit to the application. This is e.g. the case for an antenna interface between an RF-IC (radio frequency integrated circuit, radio frequencies (RF) being e.g. defined as the frequency range between 3 kHz and 3 GHz) and an antenna resonating with the input capacitance of the RF-IC. In such cases a larger voltage swing (for a given needed transmit power) enables the use of an antenna with a higher impedance (e.g. a larger inductance). This gives less on-chip capacitance (for a given frequency of operation), and hence significant IC die area can be saved. Another important benefit of a higher impedance in such systems is that weak received signals also have higher voltage swing. This gives significantly lower current consumption in the receiver and/or better sensitivity of the radio.

US 2008/0200134 A1 deals with a transmitting device for outputting a transmission signal, an antenna device for emitting the transmission signal in the form of an electromagnetic wave, and a matching device which is electrically connected to the transmitting device and to the antenna device. The matching device includes at least two tuning elements for setting the resonant frequency of a circuit arrangement, formed from the antenna device and the first and second tuning elements, and for matching the impedance of the transmitting device and the antenna device. In an embodiment, capacitor dividers, such as a capacitor bank, are used in a single ended input in order to provide impedance transformation that enables low power operation and matching to an input port.

US 2006/0006950 A1 describes a power amplifier comprising cascode arrangements to achieve target performance levels for a power amplifier, such as the type used in wireless communication devices. A negative resistance circuit is provided for the cascode arrangement such that high gain, or oscillation, is promoted during operation of the power amplifier. In one embodiment, the negative resistance circuit includes cross-coupling transistors. Various features are provided in order to reduce the susceptibility of the power amplifier to voltage breakdown while maintaining good performance.

A relatively large voltage swing on an antenna can e.g. be adapted to lower levels (e.g. tolerable for an integrated circuit) by a suitable impedance transformation. Such transformation is typically implemented by separate discrete components (off-chip) to limit voltage swing or to maximize design flexibility or to improve the Q-factor or—in case of large capacitance values—to decrease costs. Alternatively, on-chip or off-chip inductive transformers can be used; on-chip transformers, however, only at frequencies higher than e.g. 100 MHz.

DISCLOSURE OF INVENTION

In physically small electronic devices, where volume is an important limiting parameter (such as e.g. in a portable device, e.g. a listening device, e.g. a hearing aid adapted to be worn at or in the ear of a user), the use of external components is minimized (to save space). Hence, in such cases, it may be preferable to allow the large voltage swing directly on the I/Os of a transceiver IC (e.g. by locating impedance transformation circuitry fully or partly on-chip). The use of standard CMOS or BiCMOS processes is, from a technical as well as an economic point of view, attractive to implement transceiver functions and associated signal processing.

A voltage swing in excess of 5 V (or 3.3 V or 2.5 V or 1.8 V) can be achieved by means of on-chip impedance transformation (e.g. passive transformation). In theory extremely large voltages (e.g. >100 Volt) could be supported by using the parasitic capacitance between the normal metal layers. But in many semiconductor processes it is more practical to stay at the 10 V-15 V level, because in that voltage range the normal capacitors (metal-insulator-metal MiM capacitors of a standard CMOS IC process) and diode-based ESD protection can be used. And it is still a huge improvement over the 5 V (or 3.3 V or 2.5 V or 1.8 V).

The idea of the present application is to use impedance transformation specifically to support a higher voltage swing than what is typically allowed on I/O transistors in a standard IC process (e.g. a nominal 5 V, 3.3 V, 2.5 V or 1.8 V process). In an embodiment, the impedance transformation is used to enable higher voltage swing with the purpose of providing a higher impedance of an antenna circuit. Among the benefits of the present idea are one or more of a) the provision of a decreased chip area (due to a decrease in size of on-chip capacitance) and b) a larger signal swing at the receiver to provide better receiver sensitivity and lower current consumption.

An object of the present application is to provide an integrated circuit in a standard IC process that supports larger than specified input/output swings.

Objects of the application are achieved by the invention described in the accompanying claims and as described in the following.

An object of the application is achieved by a method of enabling a high voltage input and/or output in a standard IC process, the high voltage being higher than what any of the transistors of the IC can withstand without affecting device lifetime, e.g. higher than specified for I/O transistors of the IC process. The method provides that high voltage inputs or outputs of an IC implemented in said standard IC process are electrically coupled to passive impedance transformation circuitry which on the IC (on-chip) comprises only capacitors.

Thereby the need of direct connection of high voltage inputs or outputs terminals to transistors is eliminated.

It is to be understood that the on-chip passive impedance transformation circuitry is intended to form part of an impedance transformation circuit together with circuitry external to the IC (e.g. an antenna circuit, e.g. an inductive antenna circuit comprising a coil antenna) coupled to the high voltage inputs or outputs.

Preferably, high voltage inputs or outputs of the IC are directly connected to the impedance transformation circuitry.

Preferably, a high voltage input or output of the IC comprises a terminal or pad for electrical connection of the circuitry on the chip to off-chip circuitry. The off-chip circuitry comprises another part of the passive impedance transformation circuitry, which together with the (capacitive) on-chip part provides the resulting impedance transformation allowing a higher voltage swing than what any of the transistors of the IC can withstand without affecting device lifetime.

This has the advantage of facilitating the use of a standard IC process for higher than specified voltage I/Os.

The term 'higher than what any of the transistors of the IC can withstand without affecting device lifetime' is e.g. taken to mean more than 1 V higher, such as more than 2 V higher than maximum specifications for the transistors in question (or what the foundry's reliability calculator indicates for a reasonable life time, e.g. 10 years).

In an embodiment, the method provides coupling of a high voltage input or output to an off-chip inductive antenna circuit.

In such embodiment, the method thus provides a passive impedance transformation network formed by an off-chip inductive antenna circuit coupled to high voltage input or output terminals of an IC implemented in a standard IC process, wherein the terminals are connected on-chip (except e.g. from ESD protection circuitry) only via capacitors to transistors and/or AC ground, the method thereby enabling a high voltage input and/or output in a standard IC process, the high voltage being higher than what any of the transistors of the IC can withstand without affecting device lifetime, e.g. higher than specified for I/O transistors of the IC process.

In an embodiment, a particular high voltage input or output is coupled to transmitter circuitry located on the IC. In an embodiment, the transmitter circuitry is adapted to drive an inductive antenna, e.g. a coil antenna. Preferably, a particular high voltage input or output is coupled to receiver circuitry as well as to transmitter circuitry. In an embodiment, the transmitter and receiver circuitry is adapted to be activated in complementary time periods (not active at the same time). In an embodiment, the passive impedance transformation circuitry on the IC is connected between the transmitter circuitry and a high voltage input or output of the IC. In an embodiment, the passive impedance transformation circuitry on the IC comprises (such as is essentially constituted by) capacitors.

In an embodiment, a high voltage input or output is electrically connected to electrostatic discharge (ESD) protection circuitry. ESD circuitry that may be advantageously used in connection with the passive impedance transformation circuitry of the present disclosure is described in our co-pending European patent application no. 10166750.9 filed on 22 Jun. 2010, which is incorporated herein by reference.

In general, the passive impedance transformation circuitry of a particular high voltage input or output includes contributions from external (e.g. antenna circuitry) and internal (on-chip) circuitry coupled to the high voltage input or output in question. The passive impedance transformation circuitry may comprise contributions from one or more of antenna, transmitter, receiver, frequency tuning circuitry (the frequency tuning circuitry being adapted for tuning a resonance frequency of an antenna when coupled to the high voltage I/O pad), ESD circuitry and parasitics from interconnections. Among the mentioned contributions, that of the antenna is typically external and the rest may be internal (on-chip). In practice, the passive components electrically coupled to a particular high voltage input or output and their mutual interconnection are chosen to provide an impedance transformation that enables a higher I/O voltage than that specified by the IC process in question.

The method utilizes capacitors to implement the transformation circuitry. In a particular embodiment, the method provides that the capacitors are metal-insulator-metal MiM capacitors. In an embodiment, the capacitors comprise (or is constituted by) parasitic capacitances. In an embodiment, the capacitors comprise (or is constituted by) the capacitance between conductors of one or more ordinary metal layers, e.g. in a comb-like or interdigitated structure. In an embodiment, the capacitors comprise a mixture of MiM capacitors and capacitance of one or more ordinary metal layers (e.g. parallel plates of two different ordinary metal layers or fringe capacitances between conductors of the same ordinary metal layer).

In the present context, the terms 'nominal' and 'specified' ratings are used interchangeably to indicate parameter values as specified by the vendor of a given IC process. Typically, maximum allowable values are referred to, e.g. values of voltages that active devices (e.g. transistors, such as input/output transistors) are specified to be able to tolerate or deliver.

The standard IC process may in general be of any kind comprising components (including transistors) for which nominal ratings (e.g. maximum voltages) are specified. Presently known standard IC processes include processes specifying a maximum voltage of 5 V or 3.3 V or 2.5 V or 1.8 V for inputs or outputs. In an embodiment, the standard IC process is a CMOS or BiCMOS process (cf. e.g. such semiconductor processes from (among many other vendors) Austria Microsystems). In an embodiment, the standard process is a process wherein a standard thick oxide transistor (e.g. used for the input/output (I/O) transistors) is adapted to tolerate a maximum voltage, e.g. of 5 V or 3.3 V input or output voltage.

In an embodiment, the method provides that the voltage swing of a high voltage input or output is larger than 4 $V_{pp}$, such as larger than 6 $V_{pp}$, such as larger than 8 $V_{pp}$, such as larger than 10 $V_{pp}$. In an embodiment, the method provides that a high voltage swing of a high voltage input or output is more than twice the maximum transistor voltage rating, such as more than 2.5 or 3 times the maximum transistor voltage rating (of I/O-transistors).

In general, the passive impedance transformation circuitry is adapted to provide a larger transmit voltage swing than specified for the IC process in question. In an embodiment, the method comprises providing one or two transmitter drivers for, respectively, singleendedly or differentially, driving an external antenna circuit (e.g. comprising an inductance and/or a capacitance and possibly a resistance), electrically coupling said external antenna circuit to one or more of the high voltage inputs or outputs, electrically coupling each of the transmitter driver(s) to a respective high voltage input or output via an on-chip series capacitance, and providing that the series capacitance(s) form(s) part of the passive impedance transformation circuitry together with the antenna circuitry and other capacitance or inductance connected to said high voltage inputs or outputs, said passive impedance transformation circuitry being adapted to provide a larger transmit voltage swing than specified for the IC process in question.

In an embodiment, the method comprises providing that the transmitter driver and the series capacitance constituting a Tx-circuit is split into a number of parallel Tx-sub-circuits to provide control of the output voltage swing in a number of steps, and providing that the outputs of the transmitter drivers of Tx-sub-circuits that are not currently active are switched to ground. This has the advantage of providing that the total capacitance contributed by the Tx-sub-circuits, as seen by the external antenna circuit, is independent of the number of active Tx-sub-circuits. In an embodiment, the parallel Tx-sub circuits are equal. In an embodiment, the parallel Tx-sub circuits are weighted in a binary fashion or according to some other weighting scheme. In an embodiment, the selection or programming of the output voltage swing can be controlled via a programming interface (e.g. to a programming device, e.g. running a fitting software in case the transceiver IC form part of a listening device).

In an embodiment, the method comprises providing that the sum of series capacitances of the parallel Tx-sub-circuits is equal to the (total) series capacitance of the Tx-circuit. Thereby the output voltage swing can be programmed, without influencing the resonance frequency of the antenna circuit including the load of the transceiver IC.

In an aspect, a transceiver IC implemented in a standard IC process is furthermore provided by the present application. The transceiver IC comprises a number of high voltage I/O pads and wherein each high voltage I/O pad is connected to passive impedance transformation circuitry on the IC comprising only capacitors.

It is intended that the structural features of the method described above, in the detailed description of 'mode(s) for carrying out the invention' and in the claims can be combined with the transceiver IC, when appropriately substituted by a corresponding structural feature and vice versa. Embodiments of the IC have the same advantages as the corresponding method.

Again, it is to be understood that the on-chip passive impedance transformation circuitry is intended to form part of an impedance transformation circuit together with circuitry external to the IC (e.g. an antenna circuit, e.g. an inductive antenna circuit comprising a coil antenna) coupled to the high voltage inputs or outputs.

A transceiver IC is in the present context taken to mean a circuit that is adapted (together with an external antenna circuit, e.g. an antenna coil or a patch antenna) to transmit and/or receive electromagnetic radiation (be it far-field or near-field). The 'transceiver IC' may advantageously comprise other functionality than what is directly related to the transmission and/or reception of an electric signal from an (external) antenna. Such functionality may include modulation/demodulation circuitry, A/D-, D/A-conversion, coding/decoding circuitry, signal processing, e.g. including audio signal processing, noise reduction, etc.

In an embodiment, circuitry of the IC (including the on-chip (capacitive) passive impedance transformation circuitry) that is connected to a high voltage I/O pad is particularly adapted to an inductive load of the high voltage I/O pads.

In an embodiment, the IC comprises transmitter circuitry coupled to a particular high voltage input or output. In an embodiment, the transmitter circuitry is adapted to drive an inductive antenna, e.g. a coil antenna. In an embodiment, a particular high voltage input or output is coupled to receiver circuitry as well as to transmitter circuitry. In an embodiment, the transmitter and receiver circuitry is adapted to be activated in complementary time periods (not active at the same time). In an embodiment, a part of the passive impedance transformation circuitry on the IC is connected between the transmitter circuitry and a high voltage input or output of the IC. In an embodiment, the passive impedance transformation circuitry on the IC comprises (such as is essentially constituted by) capacitors. Thereby a solution that is particularly well-suited for transmission frequencies below 100 MHz (e.g. below 30 MHz, e.g. below 10 MHz) is provided.

In an embodiment, a high voltage input or output is electrically connected to electrostatic discharge (ESD) protection circuitry.

In an embodiment, the high voltage input or output pads or terminals of the IC are connected on-chip (except e.g. from ESD protection circuitry) only via capacitors to on-chip transistors and/or AC ground. In an embodiment, the high voltage inputs or outputs are connected to on-chip transistors and/or AC ground via on-chip capacitors.

In an embodiment, the standard IC process is a CMOS or BiCMOS semiconductor process.

In general, the passive impedance transformation circuitry is adapted to provide a larger transmit voltage swing than specified for the IC process in question. In general, the passive (on-chip) impedance transformation circuitry coupled to a particular high voltage I/O pad comprises contributions from one or more of transmitter, receiver, frequency tuning circuitry (the frequency tuning circuitry being adapted for tuning a resonance frequency of an antenna when coupled to the high voltage I/O pad), ESD circuitry and parasitics from interconnections. In practice, the passive components electrically coupled to a particular high voltage I/O pad and their mutual interconnections are chosen to provide an impedance transformation that enables a higher I/O voltage than that specified by the IC process in question.

In an embodiment, the combined (off-chip and on-chip) impedance transformation circuitry is based on capacitors or inductors or resistors or a combination thereof. The on-chip impedance transformation circuitry is based on (such as constituted by) capacitors. In an embodiment, the capacitors comprise (or is constituted by) metal-insulator-metal MiM capacitors and/or capacitors formed by fringing and/or parallel plate capacitance of normal metal interconnect layers. In an embodiment, the impedance transformation circuitry comprises a tapped capacitor circuit with capacitance switching.

In an embodiment, the circuitry connected to at least one of the high voltage swing I/O pads is adapted to be connected to an antenna, e.g. a coil or a patch antenna (the antenna being e.g. external of the transceiver IC).

In an embodiment, the transceiver IC comprises circuitry for tuning the resonance frequency of an external antenna when loaded with by the transceiver IC. In an embodiment, the tuning circuitry comprises one or more capacitors or inductors or resistors or a combination thereof. In an embodiment, the circuitry for tuning the antenna resonance frequency (when loaded, including the transceiver IC) comprises a tapped capacitor circuit including one or more switches to bypass one or more corresponding capacitors (and thereby tune the capacitance (and hence a resonance frequency)). In an embodiment, the circuitry for tuning the antenna form part of the passive impedance transformation circuitry.

In an embodiment, the passive impedance transformation circuitry is adapted to protect a transmitter output, and/or a receiver input and/or a frequency tuning circuit.

In an embodiment, the transceiver IC comprises one or two transmitter drivers for, respectively, singleendedly or differentially, driving an external antenna circuit (e.g. comprising an inductance and/or a capacitance and possibly a resistance), said external antenna circuit being electrically coupled to one or more of said high voltage I/O pads, each of said transmitter drivers being coupled to a respective high voltage I/O pad via an on-chip series capacitance, said series capacitance forming part of said passive impedance transformation circuitry together with said antenna circuitry and other capacitance or inductance connected to said high voltage I/O pad(s), said passive impedance transformation circuitry being adapted to provide a larger transmit voltage swing than specified for the IC process in question.

In an embodiment, the transmitter driver and the series capacitance constitute a Tx-circuit, which is split into a number of parallel Tx-sub-circuits to provide control of the output voltage swing in a number of steps, and wherein the transceiver IC is adapted to provide that the output of the transmitter drivers of Tx-sub-circuits that are not currently active are switched to ground. This provides that the total capacitance contributed by the Tx-sub-circuits, as seen by the external antenna circuit, is independent on the number of active Tx-sub-circuits. The parallel Tx-sub circuits may be equal or binarily weighted or weighted in some other appropriate fashion.

In an embodiment, the sum of series capacitances of the parallel Tx-sub-circuits is equal to the (total) series capacitance of the Tx-circuit. Thereby the output voltage swing can be programmed, without influencing the resonance frequency of the antenna circuit including the load of the transceiver IC.

In an embodiment, the transmitter driver comprises an inverter and/or a logic gate, e.g. an OR-gate or an AND-gate (the OR- or AND-gates being e.g. used to switch a transmitter driver to ground when not active).

In an embodiment, the transceiver IC is adapted to transmit and/or receive electromagnetic energy at frequencies below 3 GHz, e.g. in a range between ~30 MHz and 3 GHz, when coupled to an external antenna circuit.

In an embodiment, the transceiver IC is adapted to transmit and/or receive electromagnetic energy at frequencies below ~30 MHz, e.g. in a range between 100 kHz and 30 MHz, when coupled to an external antenna circuit.

An article of manufacture comprising a transceiver IC as described above, in the detailed description of 'mode(s) for carrying out the invention' and in the claims and a separate (external) load circuit, e.g. an antenna circuit, e.g. a coil or patch antenna, is furthermore provided. At least one of the terminals of the antenna is electrically connected to a high voltage I/O pad of the transceiver IC. The antenna circuit is external to the IC (that is the antenna circuit, e.g. comprising a coil or a patch element, does not form part of the IC).

The on-chip passive impedance transformation circuitry is intended to form part of an impedance transformation circuit together with circuitry of the load circuit (e.g. an antenna circuit, e.g. an inductive antenna circuit comprising a coil antenna) coupled to the high voltage inputs or outputs.

In an embodiment, the transceiver IC and the antenna are adapted to transmit and/or receive electromagnetic energy at frequencies below 3 GHz, e.g. in a range between ~30 MHz and 3 GHz.

In a preferred embodiment, the transceiver IC and the antenna are adapted to transmit and/or receive electromagnetic energy at frequencies below ~30 MHz, e.g. in a range between 100 kHz and 30 MHz.

In a preferred embodiment, load circuit, e.g. an antenna circuit, is inductive, e.g. comprising an inductor (coil).

In an embodiment, the antenna is differentially coupled to the transceiver IC (in that the two terminals of the antenna circuit are connected to each their high voltage I/O pad of the transceiver IC). Alternatively, the antenna may be singleendedly coupled to the transceiver IC (in that one of the terminals of the antenna circuit is connected to high voltage I/O pad of the transceiver IC and the other to a fixed voltage, e.g. to ground).

In an embodiment, the antenna and transceiver IC implement a wireless electrical interface. In an embodiment, the wireless interface is adapted to transmit and/or receive an audio signal. In the present context, an audio signal comprises frequencies within the human audible range, e.g. in the range from 20 Hz to 20 kHz.

In an embodiment, the article of manufacture comprises a (possibly standardized) electric interface (e.g. according to a proprietary scheme or to the DECT- or Bluetooth- or Zigbee- or WLAN-standards).

The article of manufacture may in general be of any kind utilizing a wireless interface. In a particular embodiment, the article of manufacture comprises a portable device, e.g. a communication device, e.g. a mobile (e.g. cellular) telephone or a listening device. In an embodiment, the listening device comprises a headset or a hearing instrument or a headphone or an active ear protection device or a combination thereof.

In a particular embodiment, the article of manufacture comprises a local energy source, e.g. a battery, such as a rechargeable battery, for energizing electronic parts of the article (including the transceiver IC).

In an embodiment, the article of manufacture is adapted to provide a frequency dependent gain to compensate for a hearing loss of a user (e.g. implemented in a signal processing unit).

In an embodiment, the article of manufacture comprises an input transducer (e.g. a microphone system). In an embodiment, the article of manufacture comprises an output transducer. In an embodiment, the output transducer comprises a speaker (receiver). In an embodiment, the output transducer comprises an electrode of a cochlear implant. In an embodiment, the output transducer comprises vibrator of a bone conducting hearing aid.

In an embodiment, the article of manufacture comprises an antenna and transceiver circuitry for receiving and/or transmitting a direct electric input signal comprising an audio signal (the transceiver circuitry being part of the transceiver IC). In an embodiment, the article of manufacture comprises demodulation and/or modulation circuitry for, respectively, demodulating and modulating the received and transmitted direct electric input signal comprising the audio signal.

Use of a transceiver IC as described above, in the detailed description of 'mode(s) for carrying out the invention' and in the claims is furthermore provided. In an embodiment, use in a listening device, e.g. a hearing instrument, a headset, an earphone, an active ear protection device or a combination thereof is provided.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which.

The figures are schematic and simplified for clarity, and they just show details which are essential to the understanding of the disclosure, while other details are left out.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

MODE(S) FOR CARRYING OUT THE INVENTION

Figure 1:
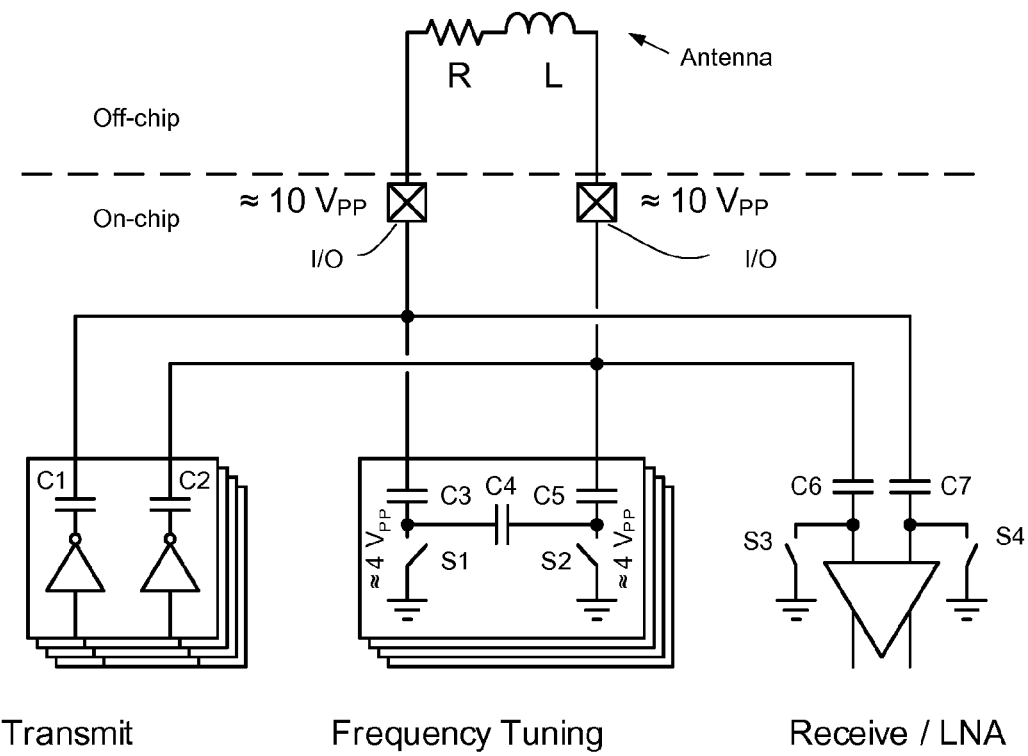
FIG. 1 shows an article of manufacture as described in the present disclosure.

FIG. 1 shows an article of manufacture as described in the present disclosure.

The embodiment of an article of manufacture shown in FIG. 1 comprises a transceiver IC and an antenna circuit (separated by the bold dashed line and indicated by the 'On-chip' and 'Off-chip' references below and above the dashed line, respectively). The resistor (R) and inductor (L) in the top, off-chip, part of FIG. 1 represent the antenna (e.g. a loop antenna) with loss (either representing the equivalent resistance of the antenna or additionally including an external tuning resistor). The embodiment of a transceiver IC shown in FIG. 1 comprises a transmitter circuitry part (denoted Transmit) comprising a number of (e.g. identical or binary or otherwise weighted) unit circuits, indicated by the multiple circuits behind the front circuit in FIG. 1, a receiver circuitry part (denoted Receive/LNA in FIG. 1) and a frequency tuning circuitry part (denoted Frequency Tuning in FIG. 1) comprising a number of (e.g. identical or binary or otherwise weighted) unit circuits, indicated by the multiple circuits behind the front circuit. The external antenna is differentially coupled to the transmitter and receiver parts of the transceiver IC. Alternatively, they may be singleendedly coupled. The transceiver IC typically comprises other circuitry (not shown) adapted for providing processed signals to the transmitter part and to process signals from the receiver part. The transceiver IC may comprise receiver circuitry without comprising transmitter circuitry and vice versa. The on-chip capacitors C3-C5 in FIG. 1 constitute a part of the passive impedance transformation circuitry protecting the frequency tuning switch transistors (S1, S2). The on-chip capacitors C1-C2 in FIG. 1 constitute together with on-chip capacitors C3-C7 and the antenna circuit a passive impedance transformation network enabling a voltage swing on the I/Os that is generally larger than specified for I/Os of the IC process in question, cf. also FIG. 4 and corresponding description. Other setups are possible (e.g. including an off-chip capacitive patch antenna and on-chip inductances or a mixture of on-chip capacitances and inductances and/or resistances and/or off-chip components). The main point is that the only devices that are exposed to the high voltage are passive components (e.g. capacitors) and ESD protection circuitry (not shown, but may be coupled directly between an I/O-pad and a common potential, e.g. ground). The terminals of the antenna circuit are electrically connected to high voltage I/O pads (I/O) of the transceiver IC. A maximum voltage swing of approximately 10 $V_{pp}$ is indicated on the I/O pads. Depending on the standard CMOS IC process in question and the values of the components constituting the antenna and impedance transformation circuitry, the maximum voltage swing of the I/O-pads may be smaller or larger than this value. The transistors that are used as switches (S1-S2 in FIG. 1) are exposed to a voltage swing from roughly −0.4 V to a maximum voltage of an I/O transistor of the standard CMOS IC process in question (e.g. 3.6 V (3.3 V+10%)), in FIG. 1 indicated to be approximately 4 $V_{pp}$. Switches S1 and S2 may be open or closed in receive as well as in transmit mode. In both cases frequency tuning is advantageous. In an embodiment, frequency tuning is performed according to a predefined scheme, e.g. in connection with a shift from a transmit mode to a receive mode of the transceiver IC. The transceiver IC is adapted to be in a transmit mode or in a receive mode. The transceiver IC in FIG. 1 is shown to be in a receive mode (switches S3-S4 being open, and where the received signal typically has a relatively small voltage swing (having travelled from a typically 'distant' transmitter)). The receiver inputs are switched to ground during transmit mode (by closing switches S3, S4). The outputs of the transmitter drivers are either at ground in a receive mode or limited, e.g. to a voltage square wave (e.g. from 0 V to $V_{Bat}$), in a transmit mode. This has the advantage that no active devices (transistors) are exposed to more than the nominal voltage of the standard CMOS process (e.g. 3.3 V +/−10%) that they can withstand. Exposure to higher voltage causes shorter device life times—and (depending on the actual voltage) perhaps even instant permanent damage.

Among the benefits of the availability of relatively high voltage swing I/Os (⇔ high antenna impedance) are:
- ≈Significantly (e.g. 2-3 times) smaller area for on-chip capacitance.
- ≈Significantly (e.g. 2-3 times) larger signal swing at the receiver input (than would otherwise be possible with a fully integrated tank—exclusive of the antenna) ⇔ better radio sensitivity and up to 50% lower current consumption in the low noise amplifier (LNA).

The Frequency Tuning circuit (cf. FIG. 1—center part) uses a tapped capacitor impedance transformation network to reduce the voltage swing at the switch transistors. The Transmit part (cf. FIG. 1—left) uses a different method of impedance transformation. Seen from the output of the Tx inverters (drivers) the network can be viewed as a combination of an L-match and a tapped capacitor (involving capacitors C1-C7 and the antenna). With the right selection of capacitor values for a given antenna and desired resonance frequency it is possible to e.g. drive the inverters with an output square wave voltage between 0.0 V and 1.2 V (the two drive signals being of opposite polarity) and get a 10 $V_{pp}$ voltage swing at each antenna terminal. So, only the passive devices are exposed to higher than the nominal voltages. In fact the voltages at the outputs of the inverters are so well controlled and can be low enough to enable the use of thin-oxide (core) transistors, which have better drive characteristics. In addition, the power efficiency is very high due to class-D like operation. The impedance at higher harmonics is reduced due to the shunt capacitors (C3-C5 and possibly C6-C7) so the theoretically achievable efficiency is not quite 100% (as is the case for normal class-D drive)—but it is still very high. An efficiency up to 80-90% can easily be achieved with appropriate component values.

This transmitter (Tx) type by itself has constant envelope so it is best for constant envelope modulation types (e.g. FSK (frequency shift keying), PSK (phase shift keying), MSK (minimum shift keying)). However the amplitude can be changed by changing the square wave voltage, which can be achieved with a DC/DC converter. This of course means additional circuit complexity and possible efficiency loss. Also, it is easiest for adjusting the general Tx power level (no amplitude modulation). Another method of scaling transmit power is by changing the duty cycle of the square wave (less than 50% gives a smaller fundamental component and thus lower output power). Again this is easiest for the general adjustment of the transmit power and efficiency drops somewhat. A third method is to use two or more parallel transmitter circuits (as indicated in FIG. 1 with the underlying stacked or 'shadow' rectangles). These can be identical unit Tx-circuits, binary weighted or weighted in other ways. The transmit power can now be accurately controlled by simply writing an amplitude control word, which controls which of the Tx-units that should be driven with a square wave. In the remaining Tx circuits the outputs of the inverters are switched to ground. This has several advantages A) The resonance frequency is not changed (would be in case of 3-state), B) MOS devices are not exposed to high voltage swing, C) better common mode control (as much as possible is tied to GND). Similarly in receive (Rx) mode all inverter outputs are switched to ground. This minimizes noise coupling from the supply.

Assuming that the system operates at 10 MHz, then L could be e.g. 10 μH and C1-C5 would be in the 10-100 pF range (Cx representing the sum of all Cx contributions from sub-circuits). C6-C7 are chosen such that they are significantly larger than the input capacitance of the LNA (to avoid capacitive voltage division), but not too large to avoid detuning the resonator too much (reducing the effective tuning range). C6-C7 could e.g. be in the 1-10 pF range. The antenna could have a Q-factor e.g. in the range 10-50 corresponding to values of R in the range 13-65 ohm. In case of other operating frequencies (which may be any frequency below 3 GHz) the component values should be adapted accordingly.

The capacitive impedance transformation circuit shown in FIG. 1 (Frequency Tuning circuit in FIG. 1) is of course only exemplary. In general it may comprise a combination of passive components (capacitors, inductors and/or resistors). FIG. 2a-2e illustrate a number of circuits that may be used as an alternative to the circuit shown in FIG. 1 (and/or on some of the parallel Frequency Tuning circuits indicated in FIG. 1). FIG. 2a-2e are examples of tapped capacitor circuits comprising one or more controllable switches allowing one or more respective capacitors to be bypassed.

Figure 2A:
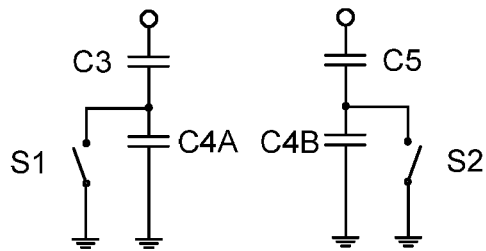
FIG. 2 shows various exemplary circuits implementing a capacitive impedance transformation with capacitance switching that may be used in the Frequency Tuning circuit(s) of FIG. 1.

FIG. 2a shows two single ended capacitance switching circuits (used differentially) providing voltage division/impedance transformation. The circuit has the advantage of providing low common mode impedance but at the cost a larger chip area.

Figure 2B:
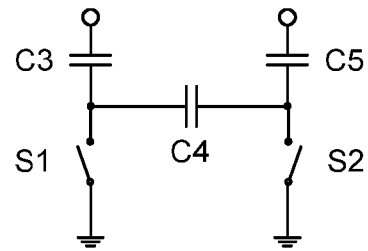

FIG. 2b shows an impedance transformation circuit as in FIG. 2a. The circuit has the advantage of providing a smaller chip area but at the cost of a higher common mode impedance, when open.

Figure 2C:
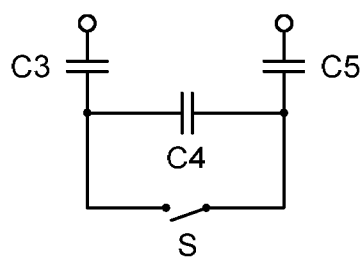

FIG. 2c shows an impedance transformation circuit as in FIG. 2b, but completely differential in nature. The circuit has the advantage of providing smaller switch area, or lower loss for the same switch area (~higher Q) at the cost of a constantly high common mode impedance.

Figure 2D:
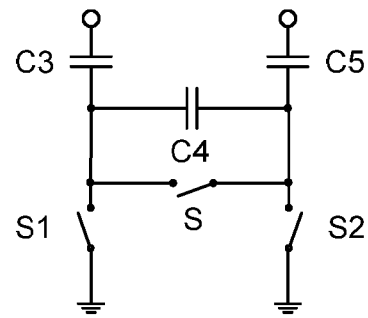

FIG. 2d shows an impedance transformation circuit providing a combination of the circuits shown in FIGS. 2b and 2c.

Figure 2E:
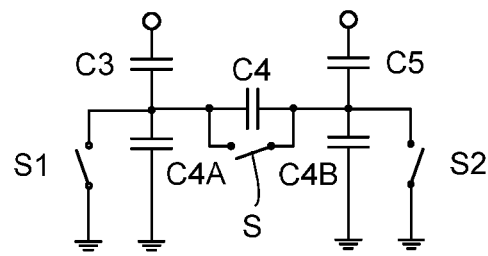

FIG. 2e shows an impedance transformation circuit providing a combination of the circuits shown in FIG. 2a-2d. The circuit with arbitrary weighting of switch and capacitor sizes has the advantage of providing maximum design flexibility for optimal circuit performance.

Any of the circuits illustrated in FIG. 2a-2e may be connected in parallel to implement a number of unit circuits (or sub-circuits), as e.g. indicated in FIG. 1 by the stacked rectangles below the (upper) Frequency Tuning circuit.

EXAMPLE

Figure 3:
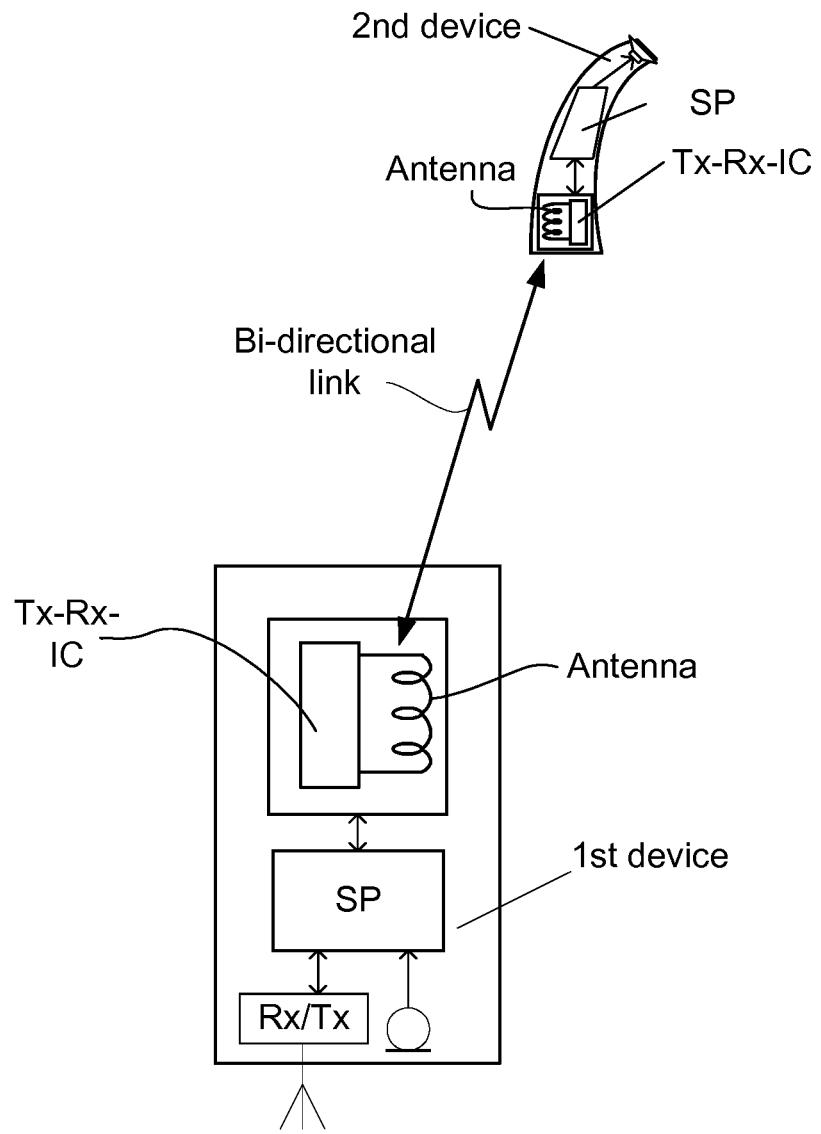
FIG. 3 shows an application of embodiments of an article of manufacture as described in the present disclosure.

FIG. 3 shows an application of embodiments of an article of manufacture as described in the present disclosure. The system shown in FIG. 3 comprises embodiments of $1^{st}$ and $2^{nd}$ articles of manufacture according to the present disclosure. The first article of manufacture ($1^{st}$ device) comprises a coil antenna (Antenna) connected to a transceiver IC (Tx-Rx-IC) comprising passive impedance transformation circuitry (cf. FIG. 1). The second article of manufacture ($2^{nd}$ device), here having the form of a listening device, e.g. a headset or a hearing instrument (here shown as a behind the ear part of a hearing instrument), likewise comprises a coil antenna (Antenna) connected to a transceiver IC (Tx-Rx-IC) as described above (FIG. 1). The respective antennas and transceiver ICs implement a (possibly uni-directional or bi-directional) wireless link between the $1^{st}$ and $2^{nd}$ devices. The wireless link is adapted to at least enable the forwarding of an audio signal from the $1^{st}$ to the $2^{nd}$ device. The $1^{st}$ and $2^{nd}$ devices both comprise a signal processing unit (SP), here shown separately from the transceiver ICs, adapted for communicating with the respective transceiver ICs. Alternatively, the signal processing units may fully or partially form part of the transceiver ICs of the $1^{st}$ and/or $2^{nd}$ devices. The $2^{nd}$ device comprises a speaker connected to the signal processing device and adapted for presenting a processed audio signal to a user as an acoustic signal. The 1st device comprises a microphone for picking up an acoustic signal from the environment and a further antenna (and corresponding transceiver circuitry Rx/Tx) for receiving and/or transmitting a wireless signal (e.g. comprising an audio signal) from/to another device. The microphone and the antenna/transceiver circuitry (Rx/Tx) are connected to the signal processing unit (SP) for further processing of the corresponding signals and allowing communication with the transceiver IC (Tx-Rx-IC) (and as regards the microphone signal with the transceiver circuitry Rx/Tx). The signal processing units of the 1st and 2nd devices may perform functional tasks of the devices in question, e.g. audio processing, e.g. providing a frequency dependent gain to compensate for a user's hearing impairment and/or other signal enhancement features (e.g. noise reduction). The signal processing units (SP) are further, preferably, adapted to be able to modify (calibrate) the tuning of the antenna circuitry of the respective devices, e.g. based on measurements of current resonance frequency $f_0$ and bandwidth $BW_{ant}$ of the antennas. Preferably, the calibration is performed at predefined points in time, e.g. during startup of the devices or regularly, e.g. with predefined time intervals (i.e. with a predetermined frequency), e.g. at a frequency larger than 0.01 Hz, such as larger than 0.1 Hz, such as larger than 1 Hz. In an embodiment, the transceiver IC further comprises trimming capacitors for use in calibrating the resonance frequency $f_0$ and bandwidth $BW_{ant}$ of the antennas (e.g. allowing the switching in or out of capacitance units to modify the capacitance coupled to the antenna inputs in question (e.g. C3-C7 of FIG. 1). The 1st device can e.g. be a mobile telephone or an intermediate device (e.g. an audio gateway) between a communication device (e.g. a mobile telephone) or an (audio) entertainment device and the 2nd device. The 2nd device can e.g. be a listening device, such as a headset or an earphone or a hearing instrument or an audio protection device (or a combination thereof). In an embodiment, the Bi-directional link between the 1st and 2nd devices is based on a magnetic coupling (reactive near-field) between respective antenna coils of the two devices. Alternatively, it may be based on electromagnetic radiation (far-field).

The wireless link between the 1st and 2nd device is indicated to be bi-directional, but may just as well be uni-directional (e.g. where the 1st and 2nd devices comprise only transmitter and receiver circuitry, respectively). A protocol for a uni-directional inductive link is e.g. described in US 2005/0255843 A1. An example of a system comprising a hearing instrument and an audio selection device is e.g. described in EP 1 460 769 A1. Inductive communication (i.e. communication based on electromagnetic induction as opposed to electromagnetic radiation) between a hearing instrument and a gateway device in accordance with a standard or proprietary protocol is e.g. described in EP 1 480 492 A2. The wireless link may e.g. carry an audio signal (e.g. streaming audio from an entertainment device or a telephone), e.g. in stereo. The bandwidth (or bit rate) of the signal to be transmitted may be adapted to be in the order of tens or hundreds of kHz (kbit/s) or in the order of MHz (Mbit/s). The range of the link may be adapted to be in the range from a few centimeters to tens of meters. In a preferred embodiment, the range is adapted to distances occurring for devices to be worn on a persons' body (e.g. less than 2 m such as less than 1 m, such as less than 0.5 m).

Figure 4A:
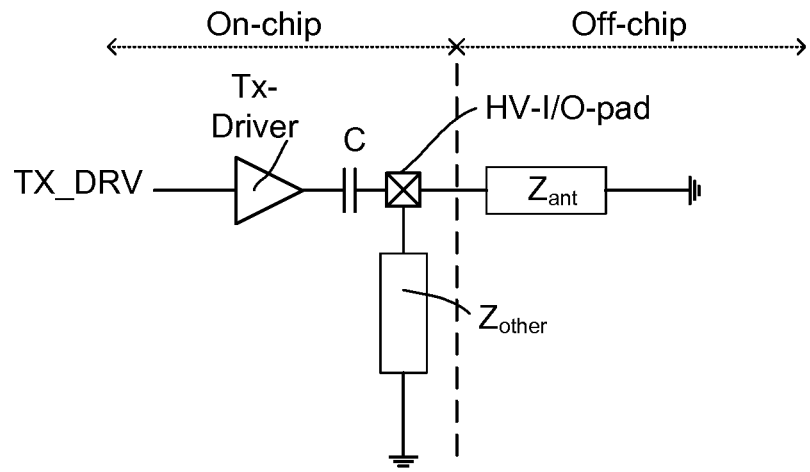
FIG. 4 illustrates the contributions to the passive impedance transformation for a high voltage output of a transceiver IC for a singleended (FIG. 4a) and a differential configuration (FIG. 4b).
Figure 4B:
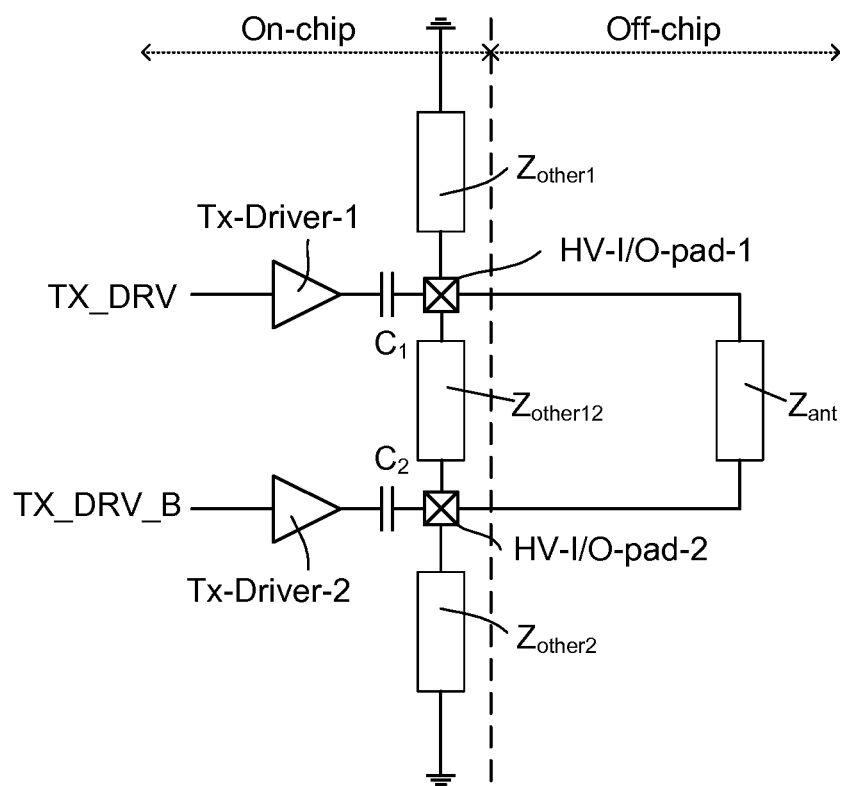

FIG. 4 illustrates various contributions to the passive impedance transformation for a high voltage output of a transceiver IC for a singleended (FIG. 4a) and a differential configuration (FIG. 4b). The circuitry illustrated in FIG. 4 form part of an article of manufacture (e.g. of a 1st or 2nd device as shown in FIG. 3) comprising a transceiver IC and an antenna circuit. The circuitry forming part of the transceiver IC and the components forming part of the (external) antenna circuit are separated by the vertical bold dashed line and indicated by the 'On-chip' and 'Off-chip' references to the left and right of the dashed line, respectively. Together with the (capacitive) on-chip impedance transformation circuitry, the off-chip components constitute the total impedance transformation circuit.

In the single-ended configuration of FIG. 4a, a transmit driver (Tx-Driver) is driven by input signal TX_DRV to be transmitted by an external antenna represented by antenna impedance $Z_{ant}$ (which can be inductive or capacitive in nature), cf. e.g. circuits in the bottom left and top parts of FIG. 1. The on-chip transmit driver (Tx-Driver) is connected to a high voltage I/O-pad (HV-I/O-pad) of a transceiver IC via a series capacitance C. The same high voltage I/O-pad is connected to one terminal of the external antenna whose other terminal is connected to ground. The same high voltage I/O-pad is also connected to other passive circuitry, which is referred to ground (e.g. frequency tuning circuitry, a low noise amplifier input, ESD protection circuitry and parasitics from interconnections), cf. e.g. circuits in the bottom middle and right parts of FIG. 1. The combined impedance of these circuits is in FIG. 4a denoted by $Z_{other}$, and is typically, but not necessarily, capacitive and lossy in nature. C, $Z_{ant}$ and $Z_{other}$ together constitute an impedance transforming network, which for properly chosen values, enables the generation of a high voltage swing on the HV-I/O-pad even though the network is being driven with a nominal voltage or lower. The driver (Tx-Driver) and series capacitance (C) can be split up in a number of parallel sub-circuits to enable control over the amplitude of the high voltage swing (cf. e.g. bottom left part of FIG. 1). $Z_{other}$ may e.g. include contributions from ESD circuitry coupled between HV-I/O-pad and ground.

In the differential configuration of FIG. 4b, two transmit drivers (Tx-Driver-1, Tx-Driver-2) are driven by differential input signals TX_DRV, TX_DRV_B to be transmitted by an external antenna represented by antenna impedance $Z_{ant}$ (which can be inductive or capacitive in nature). The on-chip transmit drivers (Tx-Driver-1, Tx-Driver-2) are connected to each their high voltage I/O-pad (HV-I/O-pad-1, HV-I/O-pad-2, respectively) of a transceiver IC via series capacitances C1, C2, respectively. The same high voltage I/O-pads (HV-I/O-pad-1, HV-I/O-pad-2) are connected to respective terminals of the external antenna. C1, C2, $Z_{ant}$, $Z_{other1}$, $Z_{other2}$ and $Z_{other12}$ connected to HV-I/O-pad-1 and HV-I/O-pad-2 together constitute an impedance transforming network, which for properly chosen values, enables the generation of a high voltage swing on HV-I/O-pad-1, HV-I/O-pad-2 even though the network is being driven with a nominal voltage or lower. The drivers and C1, C2 can be split up in a number of parallel sub-circuits to enable control over the amplitude of the high voltage swing (cf. FIG. 1). Preferably, $Z_{other1}$ and $Z_{other2}$ are selected to be equal (to enable differential transmission and/or reception).

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

US 2008/0200134 A1 (INFINEON) 21 Aug. 2008
US 2006/0006950 A1 (Burns et al.) 12 Jan. 2006

US 2005/0255843 A1 (Hilpisch et al.) 17 Nov. 2005
EP 1 460 769 A1 (PHONAK) 22 Sep. 2004
EP 1 480 492 A2 (SIEMENS AUDIOLOGISCHE TECHNIK) 24 Nov. 2004

The invention claimed is:

1. A method of enabling a high voltage input and/or output in a standard IC process, the high voltage being higher than what any of the transistors of the IC can withstand without affecting device lifetime, the method comprising:
   providing that high voltage inputs or outputs of an IC implemented in said standard IC process are electrically coupled to passive impedance transformation circuitry, the passive impedance transformation circuitry on the IC only including capacitors; and
   coupling the high voltage inputs or outputs to an off-chip inductive antenna circuit, wherein
   an impedance transformation circuit is formed by the passive impedance transformation circuitry on the IC together with said off-chip inductive antenna circuit.

2. A method according to claim 1, wherein
   the IC comprises one or two transmitter drivers for, respectively, singleendedly or differentially, driving an external antenna circuit, when said external antenna circuit is electrically coupled to one or more of said high voltage inputs or outputs,
   providing that each of said transmitter drivers are coupled to one of said high voltage inputs or outputs via an on-chip series capacitance, said series capacitance forming part of said passive impedance transformation circuitry together with said antenna circuitry and other capacitance or inductance connected to said high voltage I/O pad(s), said passive impedance transformation circuitry being adapted to provide a larger transmit voltage swing than specified for the IC process in question.

3. A method according to claim 2 wherein the capacitors comprise metal-insulator-metal MiM capacitors.

4. A method according to claim 1 wherein the capacitors comprise capacitors formed by fringing and/or parallel plate capacitance of normal metal interconnect layers.

5. A method according to claim 1 wherein the standard IC process is a CMOS or BiCMOS semiconductor process.

6. A method according to claim 1, wherein
   a high voltage swing of a high voltage input or output is larger than 4 V.

7. A method according to claim 1 wherein a high voltage swing of a high voltage input or output is more than twice the specified maximum I/O transistor voltage rating.

8. A transceiver IC implemented in a standard IC process, the transceiver IC comprising:
   a number of high voltage I/O pads, each of the high voltage I/O pads being connected to passive on-chip impedance transformation circuitry on the IC, the passive on-chip impedance transformation circuitry on the IC including only capacitors; and
   a coupling between the high voltage I/O pads and an off-chip inductive antenna circuit, wherein
   an impedance transformation circuit is formed by the passive on-chip impedance transformation circuitry on the IC together with said off-chip inductive antenna circuit.

9. A transceiver IC according to claim 8 wherein the passive on-chip impedance transformation circuitry coupled to a particular high voltage I/O pad comprises contributions from one or more of a transmitter, a receiver, frequency tuning circuitry, ESD circuitry and parasitics from interconnections.

10. A transceiver IC according to claim 8 comprising
    one or two transmitter drivers for, respectively, singleendedly or differentially, driving an external antenna circuit, said external antenna circuit being electrically coupled to one or more of said high voltage I/O pads,
    each of said transmitter drivers being coupled to one of said high voltage I/O pads via an on-chip series capacitance,
    said series capacitance forming part of said passive impedance transformation circuitry together with said antenna circuitry and other capacitance or inductance connected to said high voltage I/O pad(s),
    said passive impedance transformation circuitry being adapted to provide a larger transmit voltage swing than specified for the IC process in question.

11. A transceiver IC according to claim 10
    wherein said transmitter driver and said series capacitance constituting a Tx-circuit is split into a number of parallel Tx-sub-circuits to provide control of the output voltage swing in a number of steps, and
    wherein the transceiver IC is adapted to provide that the outputs of the driver(s) of Tx-sub-circuits that are not currently active are switched to ground.

12. A transceiver IC according to claim 11 wherein the sum of series capacitances of said parallel Tx-sub-circuits is equal to the series capacitance of the Tx-circuit.

13. A transceiver IC according to claim 8 wherein
    the transceiver IC comprises circuitry for tuning the resonance frequency of an external antenna when connected to the transceiver IC.

14. A transceiver IC according to claim 13 wherein
    the circuitry for tuning the antenna resonance frequency when loaded, including the transceiver IC, comprises a tapped capacitor circuit including one or more switches to bypass one or more corresponding capacitors and thereby tune the capacitance and hence a resonance frequency.

15. A transceiver IC according to claim 8, further comprising:
    electrostatic discharge (ESD) protection circuitry electrically connected to a high voltage I/O pad.

16. A transceiver IC according to claim 8, wherein the high voltage I/O pads are connected to on-chip transistors and/or AC ground via on-chip capacitors.

17. An article of manufacture comprising:
    a transceiver IC according to claim 8; and
    a separate load circuit, wherein at least one of the terminals of the separate load circuit is electrically connected to a high voltage I/O pad of the transceiver IC.

18. An article of manufacture according to claim 17 wherein the load circuit is an antenna circuit comprising a coil antenna.

19. An article of manufacture according to claim 17, wherein
    the passive on-chip impedance transformation circuitry is adapted to form part of an impedance transformation circuit together with circuitry of the load circuit coupled to the high voltage inputs or outputs.

20. A transceiver IC implemented in a standard IC process, the transceiver IC comprising:
    a plurality of high voltage I/O pads, each of the high voltage I/O pads being connected to passive on-chip impedance transformation circuitry on the IC, the passive on-chip impedance transformation circuitry on the IC including only capacitors; and an electrical connection between at least one of the high voltage I/O pads and electrostatic discharge protection circuitry, wherein an impedance transformation circuit is formed by the passive on-chip impedance transformation circuitry on the IC together with said electrostatic discharge protection circuitry.

* * * * *